United States Patent
Rudolf et al.

(10) Patent No.: US 11,090,630 B2
(45) Date of Patent: Aug. 17, 2021

(54) METHOD FOR FURTHER PROCESSING OF CARBON RAW MATERIAL

(71) Applicant: BASF SE, Ludwigshafen am Rhein (DE)

(72) Inventors: Peter Rudolf, Ladenburg (DE); Matthias Schwab, Mannheim (DE); Waldemar Bartuli, Neustadt (DE)

(73) Assignee: BASF SE, Ludwigshafen am Rhein (DE)

( * ) Notice: Subject to any disclaimer, the term of this patent is extended or adjusted under 35 U.S.C. 154(b) by 404 days.

(21) Appl. No.: 16/061,518

(22) PCT Filed: Dec. 8, 2016

(86) PCT No.: PCT/EP2016/080177
§ 371 (c)(1),
(2) Date: Jun. 12, 2018

(87) PCT Pub. No.: WO2017/102527
PCT Pub. Date: Jun. 22, 2017

(65) Prior Publication Data
US 2020/0298200 A1     Sep. 24, 2020

(30) Foreign Application Priority Data
Dec. 18, 2015 (EP) .................................... 15201206

(51) Int. Cl.
| | | |
|---|---|---|
| *C01B 31/10* | (2006.01) | |
| *B01J 20/20* | (2006.01) | |
| *C01B 32/318* | (2017.01) | |
| *C01B 32/342* | (2017.01) | |
| *C01B 32/336* | (2017.01) | |
| *B01J 20/30* | (2006.01) | |

(52) U.S. Cl.
CPC .......... *B01J 20/20* (2013.01); *B01J 20/3085* (2013.01); *C01B 32/318* (2017.08); *C01B 32/336* (2017.08); *C01B 32/342* (2017.08); *C01P 2006/82* (2013.01)

(58) Field of Classification Search
CPC ...... C01B 32/318; C01B 32/33; C01B 32/336
See application file for complete search history.

(56) References Cited

U.S. PATENT DOCUMENTS

| | | | |
|---|---|---|---|
| 4,172,857 A * | 10/1979 | Pavilon | C10G 9/32 |
| | | | 208/127 |
| 6,316,378 B1 | 11/2001 | Giebelhausen et al. | |
| 7,524,795 B1 * | 4/2009 | Lima | C01B 32/336 |
| | | | 502/432 |
| 8,691,166 B2 * | 4/2014 | Harris | C10B 53/04 |
| | | | 422/630 |
| 2010/0038319 A1 * | 2/2010 | Boehm | C02F 1/54 |
| | | | 210/710 |
| 2014/0208945 A1 | 7/2014 | Satterfield | |

FOREIGN PATENT DOCUMENTS

| | | |
|---|---|---|
| DE | 29 47 005 A1 | 6/1981 |
| DE | 199 12 153 A1 | 9/2000 |
| DE | 199 12 154 B4 | 10/2004 |
| DE | 10 2010 031 012 A1 | 1/2012 |
| EP | 1 526 114 A1 | 4/2005 |
| EP | 1 959 462 A1 | 8/2008 |
| GB | 1101842 | 1/1968 |
| WO | WO 2008/037588 A1 | 4/2008 |

OTHER PUBLICATIONS

Ullmann's Encyclopedia of Industrial Chemistry 5th ed. vol. A 1 pp. 107-112 (1985, no month).*
Office Action dated Jun. 1, 2016 in European Patent Application No. 15201206.8.
International Search Report dated Feb. 21, 2017, in PCT/EP2016/080177, filed Dec. 8, 2016.

* cited by examiner

*Primary Examiner* — Stuart L Hendrickson
(74) *Attorney, Agent, or Firm* — Grüneberg and Myers PLLC

(57) ABSTRACT

Process for further use of a water-containing carbon raw material comprising the treatment of the carbon raw material with carbon dioxide or water vapor or a mixture thereof at elevated temperature and the admixing of the thus obtained carbon material with an acid.

19 Claims, No Drawings

METHOD FOR FURTHER PROCESSING OF CARBON RAW MATERIAL

BACKGROUND OF THE INVENTION

The present disclosure relates to a process for further use of a carbon raw material which comprises a treatment of the carbon raw material with carbon dioxide and/or water vapor and a subsequent treatment with an acid. This process provides a carbon material having a low sodium and or iron content. In addition the invention relates to the use of the carbon material produced by the present process.

PRIOR ART

Carbon finds numerous uses in various industries such as the foodstuffs industry, the chemicals industry or the pharmaceuticals industry. Specific applications are for instance use as an adsorption material for example in water treatment, air purification or for removing solvents from sensitive products such as active pharmaceutical ingredients. Carbon may also be employed in electronics components. Electronics components are for example electrodes or capacitors.

For most of these applications carbon having the highest possible purity and comprising very low, if any, proportions of alkali metals and/or heavy metals is preferred.

For many applications carbon is usually produced from so-called green coke. Green coke is generally non-calcined coke. Green coke often originates from coking of biological or organic material. Thus green coke may be obtained for example via the delayed coking process (Ullmann's Encyclopedia of Industrial Chemistry, Seventh Edition, 2010, Petroleum Coke, Chapter 3.1.1).

EP 1526114 A1 discloses a process in which according to the description a carbon having a low alkali metal and heavy metal content is obtained. According to the description carbon-containing starting materials are carbonized and subsequently treated with potassium hydroxide to obtain a so-called activated carbon. According to the disclosure said activated carbon is subsequently washed for example with hot water, carbonic acid-containing water, aqueous ammonia solution or hot hydrochloric acid.

According to DE 10 2010 031 012 A1 a carbon-containing material which may be green coke is in a first process step treated with a base and subsequently washed with citric acid.

Carbon materials obtained as a byproduct from the quench oil in the production of unsaturated hydrocarbons, in particular acetylene, are often described as acetylene coke from the oil quench process. A process for producing acetylene in which such acetylene coke is generated as a byproduct is described for example in DE 2947005 A1. Acetylene coke from the oil quench process is used for producing porous carbon in EP 1959462 A1 for example.

In DE 19912153 A1 a so-called activation process is described in which acetylene coke is subjected to a drying and carbonization step and the thus obtained carbon material is treated in an inert gas stream at elevated temperature with addition of water vapor.

According to GB 1101842, coke from acetylene production is carbonized at a temperature of 800° C. to 1000° C. and subsequently activated with water vapor or other gases at approximately 900° C.

It is an object of the present disclosure to provide a process which makes it possible to produce in a cost-effective manner a carbon material which exhibits not only high purity but in particular also high purity and high uniformity.

Presently disclosed is a process for further use of a carbon raw material, wherein the carbon raw material has a water content of 20 to 90 weight percent based on the total mass and a sulfur content of less than 0.05 percent based on the total dry mass and which comprises that the carbon raw material is treated with carbon dioxide or water vapor or a mixture thereof at a temperature up to 1100° C.

and that the thus obtained carbon material is admixed with an acid.

The disclosure provides a carbon material having a sodium content of less than 0.02 percent and/or an iron content of less than 0.025 percent based on the total dry mass which is obtainable by the above process.

Also disclosed is the use of the carbon material obtained by the above process for producing an adsorbent, for example for purification of liquids, gases or solids, a carrier material, for example for catalysts, a filling material or an electronics component, for example an electrode or a capacitor.

Also disclosed is an adsorbent which comprises the carbon material obtainable by the present process.

DESCRIPTION OF THE INVENTION

The herein reported values for water content are in each case based on the total mass. The herein reported values for carbon, sulfur, nitrogen, sodium, iron, nickel or ash are in each case based on the total dry mass.

The respective method of measurement for content determination of sulfur, nitrogen, sodium, iron or nickel is reported in the examples section. The method of measurement for determining the specific surface area is likewise reported in the examples section. The methods of measurement for determining the ash content and iodine number may likewise be found in the examples section.

The present invention makes it possible to upgrade a carbon raw material and subject it to greater value addition. By means of the process for example a carbon raw material generated as a byproduct in industrial processes may be further used. For example a carbon raw material generated as a byproduct in acetylene production in the water quench process may be further used.

A carbon raw material may be a carbon or carbon-containing material or a mixture of carbons or carbon-containing materials. A carbon raw material may have a high or very high carbon content. A carbon raw material may typically have a carbon content of at least 80 percent based on the total dry mass. A carbon raw material usually has a carbon content of at least 90 percent based on the total dry mass. The carbon raw material may preferably have a carbon content of 95 percent or more based on the total dry mass.

The carbon raw material may have different geometric shapes. For example the carbon raw material may exist as powder, flakes, as particles, as pressings, as granulate, as chippings or as a mixture of different geometric shapes. The carbon raw material may by mechanical processing be converted into any desired geometric shape suitable for use in the present process. The carbon raw material is preferably in the form of particles having an average particle diameter of 30 to 70 micrometers.

Generally, the carbon raw material may usually be employed irrespective of its origin. However, a carbon raw material already having a high to very high carbon content is generally used. Typically, such a carbon raw material is not obtained from coking of biological and/or organic material. However, carbon obtained from the coking of biological and/or organic material can be blended with the carbon raw material.

The carbon raw material may preferably be obtained from the acetylene water quench process.

The acetylene water quench process is described for example in "Ullmann's Encyclopedia of Industrial Chemistry, Sixth Edition, 2000, Vol. 1, Chapter 4.2.1". A process for separating the carbon raw material generated in the acetylene water quench process is likewise described in "Ullmann's Encyclopedia of Industrial Chemistry, Sixth Edition, 2000, Vol. 1, Chapter 4.2.1". Thus, the carbon raw material from the acetylene water quench process sinks to the bottom of the quench chamber in a sedimentation step. From there it may then be removed.

Another process for obtaining a carbon raw material from the acetylene water quench process is described for example in WO 2008037588 A1. The carbon raw material is obtained as an aqueous suspension and concentrated by sedimentation.

The water content of the carbon raw material after sedimentation is generally still above the desired value. By dewatering, the water content of the carbon raw material may be adjusted to a desired value of 20 to 90 weight percent based on the total mass. In the choice and application of suitable dewatering measures those skilled in the art will generally be guided by practical considerations, such as degree of dewatering, energetic or plant-specific considerations. The dewatering of the carbon raw material is preferably effected by filtration.

Precise modes of performance of sedimentation and filtration may be derived by those skilled in the art from the general knowledge of the art (Solid-Liquid Filtration and Separation Technology ISBN 3-527-28613-6, Handbuch der mechanischen Fest-Flüssig-Trennung ISBN 3-8027-2196-9). For example the sedimentation may be effected in commercially available sedimentation containers, for example in thickeners or lamella clarifiers. The filtration may be effected as a pressure filtration for example. To this end, the pressure filtration may be effected with chamber filter presses.

The carbon raw material has a water content of 20 to 90 percent based on the total mass. The carbon raw material may preferably have a water content of 55 to 85 percent based on the total mass. For example the carbon raw material may have a water content of 30, 40 or 50 percent based on the total mass.

Since a carbon raw material having a water content of 20 to 90 weight percent, preferably 55 to 85 weight percent, based on the total mass may be employed in the present process a separate drying and/or carbonization step may be omitted. Carbon raw material from the acetylene water quench process may be further upgraded directly after the dewatering, thus allowing a better space-time yield to be realized using the present process.

A carbonization step is generally understood to mean the treatment of a carbon material, usually green coke, at a temperature of 700° C. to 1000° C. under inert conditions. This usually removes volatile fractions from the carbon material.

It will be appreciated that a separate drying and/or carbonization step of the carbon raw material is possible but not necessary in the present process. It is usually preferable to use the carbon raw material having a water content as described above without further drying and/or carbonization, i.e. "as is".

A further advantage of the present process is that the water content introduced with the carbon raw material can be utilized for generating water vapor when the carbon raw material is treated with carbon dioxide or water vapor or the mixture of water vapor and carbon dioxide. Thus for example less, if any, water vapor need be supplied as an external feed in the treatment of the carbon raw material with water vapor or the mixture of water vapor and carbon dioxide.

It is also possible to add another carbon material and/or carbon raw material having a different water content to optimally utilize the water amount introduced with the carbon raw material.

The water content of the carbon raw material may generally be adjusted by drying and/or adding another carbon material.

The other carbon material has a carbon content determined by its origin. The other carbon material typically also has a high to very high carbon content. The other carbon material may be a carbon or a mixture of carbons. The other carbon material usually has a carbon content of at least 70 percent based on the total dry mass. The other carbon material may preferably have a different water content to the carbon raw material.

The origin of the other carbon material is generally of little importance. The other carbon material may originate from one source or be a mixture of carbon-containing materials of different origin. The other carbon material generally originates from the acetylene oil quench process or from the coking of organic or biological materials or from a mixture of the abovementioned sources. Biological materials comprise wood, sawdust, nut shells, for example walnut shells, coconut shells or stones of fruits, lignin, peat, peat moss, lignite, brown coal, bituminous coal, anthracite, bituminous coal tar, residues from crude oil distillation, petroleum pitches, cotton and staple viscose. Organic materials comprise for example phenol resins, acrylic resins and vinyl resins. The other carbon material may also be entirely or partly non-contaminated activated carbon for example. Non-contaminated activated carbon may originate from activated carbon filters that have been replaced on account of their expiration. The other carbon material may also be entirely or partly carbon fiber material for example.

The carbon raw material has a sulfur content of less than 0.05 percent based on the total dry mass. The carbon raw material usually has a sulfur content of less than 0.04 percent based on the total dry mass. The carbon raw material may preferably have a sulfur content of less than 0.03 based on the total dry mass. The carbon raw material may also be sulfur-free i.e. its sulfur content may be below the limit of detection. The carbon raw material typically has a sulfur content of 0.02 percent or more.

The carbon raw material may have a nitrogen content of less than 1.5 percent based on the total dry mass. The carbon raw material usually has a nitrogen content of less than 1.0 percent based on the total dry mass. The carbon raw material may preferably have a nitrogen content of less than 0.7 percent based on the total dry mass. The carbon raw material may also be nitrogen-free i.e. its nitrogen content may be below the limit of detection. The carbon raw material typically has a nitrogen content of 0.5 percent or more.

The carbon raw material may have a nickel content of less than 0.006 percent based on the total dry mass. The carbon raw material usually has a nickel content of less than 0.005 percent based on the total dry mass. The carbon raw material may preferably have a nickel content of less than 0.004 percent based on the total dry mass. The carbon raw material may also be free from nickel i.e. its nickel content may be below the limit of detection. The carbon raw material typically has a nickel content of 0.002 percent or more.

The carbon raw material may have a specific surface area of 100 m$^2$/g to 400 m$^2$/g. The carbon raw material usually has a specific surface area of 150 m$^2$/g to 350 m$^2$/g. The carbon raw material may preferably have a specific surface area of 200 m$^2$/g to 300 m$^2$/g. For example the carbon raw material may have a specific surface area of 180, 210, 240 oder 270 m$^2$/g.

The carbon raw material may:

have a water content of 20 to 90 percent and a sulfur content of less than 0.05 percent, or have a water content of 55 to 85 percent and a sulfur content of less than 0.05 percent, or have a carbon content of 95 percent or more, a water content of 20 to 90 percent and a sulfur content of less than 0.05 percent, or have a water content of 20 to 90 percent and a sulfur content of less than 0.05 percent and originate from the acetylene water quench process, or have a water content of 55 to 85 percent and a sulfur content of less than 0.05 percent and originate from the acetylene water quench process, or have a water content of 20 to 90 percent, a sulfur content of less than 0.05 percent and a nickel content of less than 0.006 percent and originate from the acetylene water quench process, or have a water content of 20 to 90 percent, a sulfur content of less than 0.05 percent and a specific surface area of 100 m$^2$/g to 400 m$^2$/g, or have a water content of 20 to 90 percent, a sulfur content of less than 0.05 percent and a specific surface area of 200 m$^2$/g to 300 m$^2$/g, or have a water content of 20 to 90 percent, a sulfur content of less than 0.05 percent, a nitrogen content of less than 1.5 percent and a specific surface area of 100 m$^2$/g to 400 m$^2$/g, or have a water content of 20 to 90 percent, a sulfur content of less than 0.05 percent and a specific surface area of 100 m$^2$/g to 400 m$^2$/g and originate from the acetylene water quench process, or have a water content of 20 to 90 percent, a sulfur content of less than 0.05 percent and a specific surface area of 200 m$^2$/g to 300 m$^2$/g and originate from the acetylene water quench process, or have a water content of 20 to 90 percent, a sulfur content of less than 0.05 percent, a nitrogen content of less than 1.5 percent and a specific surface area of 100 m$^2$/g to 400 m$^2$/g and originate from the acetylene water quench process, or have a water content of 20 to 90 percent and a sulfur content of less than 0.05 percent and wherein the water content of the carbon raw material may be adjusted by drying and/or adding another carbon material, or have a water content of 20 to 90 percent and a sulfur content of less than 0.05 percent and originate from the acetylene water quench process and wherein the water content of the carbon raw material may be adjusted by drying and/or adding another carbon material.

Treatment of a Carbon Raw Material

The present process comprises the treatment of the carbon raw material with carbon dioxide or water vapor or a mixture thereof.

The treatment of the carbon raw material with carbon dioxide or water vapor or a mixture thereof is typically performed under conditions under which carbon dioxide and/or water vapor are in the gas phase. On account of the water content of the employed carbon raw material, water vapor may generally be a constituent of the gas phase even when no external water vapor feed is present. The reaction of water vapor with the carbon raw material may furthermore have the result that carbon dioxide is present in the gas phase. Thus carbon dioxide too may generally be a constituent of the gas phase even when no external carbon dioxide feed is present.

Generally, carbon dioxide and/or water vapor are supplied to the carbon raw material as an external feed.

Depending on the water content of the carbon raw material it may be preferable to supply only little, if any, water vapor as an external feed. Although the constitution of carbon dioxide and/or water vapor is generally of little importance, these typically comprise only very low levels of impurities. Ideally, carbon dioxide and/or water vapor are free from impurities. Free from impurities is to be understood as meaning that the content of the respective impurities is below the respective limit of detection. Impurities may be for example traces of heavy and/or alkali metals and/or traces of sulfur compounds.

Carbon dioxide and/or water vapor may be added to the carbon raw material undiluted or diluted with inert gas.

Inert gas is generally understood to mean a gas or gas mixture which under the given reaction conditions does not enter into any reaction with the reactants, reagents or solvents involved in the reaction or the corresponding products. Inert gas may be for example nitrogen or argon or a mixture thereof. Inert gas typically comprises only very low levels of impurities. Inert gas is ideally free from impurities. Free from impurities is to be understood as meaning that the content of the respective impurities is below the respective limit of detection. Impurities may be for example traces of heavy and/or alkali metals and/or traces of sulfur compounds.

A mixture of two or more of the abovementioned gasses is generally supplied to the carbon raw material as an external feed.

During the treatment of the carbon raw material with carbon dioxide or water vapor or a mixture thereof, the concentration of carbon dioxide or water vapor or a mixture thereof in the gas phase may usually be from 5 to 100 percent. The concentration may preferably be from 10 to 95 percent. The concentration may particularly preferably be from 25 to 90 percent. The concentration of carbon dioxide, water vapor or a mixture thereof in the gas phase may change over the course of the treatment. Provided a mixture of water vapor and carbon dioxide is used the concentration of the mixture constituents may be variable, preferably variable within the specified limits.

The concentration of inert gas, for example nitrogen or argon or a mixture thereof in the gas phase is generally from 0 to 95 percent. The concentration may preferably be from 5 to 90 percent. The concentration may particularly preferably be from 10 to 75 percent. The concentration of inert gas in the gas phase may change over the course of the treatment. Provided a mixture of nitrogen and argon is used, the concentration of the mixture constituents may be variable, preferably variable within the specified limits.

The treatment of the carbon raw material with carbon dioxide or water vapor or a mixture thereof is normally effected at elevated temperature. The treatment of the carbon raw material with carbon dioxide or water vapor or a mixture thereof is generally effected at a temperature at which under the present conditions an increase in the specific surface area of the carbon raw material/of the thus obtained carbon material is observable. The treatment may be effected in any apparatus conceivable therefore, for example in a tubular oven, rotary tube oven or shelf oven. As previously mentioned carbon dioxide or water vapor or a mixture thereof may be supplied into the apparatus as an external feed. The treatment of the carbon raw material with carbon dioxide or water vapor or a mixture thereof is effected at a temperature up to 1100° C. The treatment of a carbon raw material with carbon dioxide or water vapor or a mixture thereof may preferably be effected at a temperature up to 1000° C. The treatment of a carbon raw material with carbon dioxide or water vapor or a mixture thereof may particularly preferably be effected at a temperature up to 950° C.

The heating of the carbon raw material to the target temperature may be effected under inert gas and/or carbon dioxide and/or water vapor. On account of the water content of the employed carbon raw material, water vapor may as mentioned previously generally be a constituent of the gas phase even when no external water vapor feed is present. The reaction of water vapor with the carbon raw material may as also mentioned previously furthermore have the result that carbon dioxide is present in the gas phase. Thus carbon dioxide too may generally be a constituent of the gas phase even when no external carbon dioxide feed is present. The heating of a carbon raw material may be effected for example under nitrogen and/or argon as an external feed. The heating may also be effected under nitrogen and water vapor or nitrogen and carbon dioxide as an external feed. The heating may likewise be effected under argon and water vapor or argon and carbon dioxide as an external feed. The heating may also be effected under nitrogen and water vapor and carbon dioxide as an external feed. The heating to the target temperature may equally be effected under argon and water vapor and carbon dioxide as an external feed. Depending on the desired water vapor concentration in the gas phase it may be necessary to add less water vapor, if any, as an external feed.

The target temperature is generally the temperature at which the carbon raw material is to be treated with carbon dioxide or water vapor or a mixture thereof. The target temperature is up to 1100° C., preferably the target temperature may be up to 1000° C. and particularly preferably the target temperature may be up to 950° C. In the treatment of the carbon raw material with carbon dioxide or water vapor or a mixture thereof a temperature is generally selected at which under the present conditions an increase in the specific surface area of the carbon raw material/of the thus obtained carbon material is observable. Such a temperature could be regarded for example as a minimum temperature for the treatment with carbon dioxide or water vapor or a mixture thereof. The treatment of the carbon raw material with carbon dioxide or water vapor or a mixture thereof is generally effected at a temperature of 900° C. to 950° C.

The heating rate for achieving the target temperature may be from 3 K/min to 20 K/min. The heating rate for achieving the desired temperature may preferably be from 5 K/min to 15 K/min. The heating rate for achieving the desired temperature may particularly preferably be from 8 K/min to 12 K/min.

The treatment of the carbon raw material with carbon dioxide or water vapor or a mixture thereof may be effected at a pressure of 0.5 bar to 100 bar. The treatment of the carbon raw material with carbon dioxide or water vapor or a mixture thereof may preferably be effected at a pressure of 0.5 bar to 50 bar. The treatment of the carbon raw material with carbon dioxide or water vapor or a mixture thereof may particularly preferably be effected at a pressure of 0.5 bar to 20 bar. Thus the treatment of the carbon raw material with carbon dioxide or water vapor or a mixture thereof may be effected for example at a pressure of 0.8 bar, 1.0 bar, 2.0 bar, 5.0 bar, 8.0 bar, 10 bar or 15 bar. The pressure may during the treatment of the carbon raw material with carbon dioxide or water vapor or a mixture thereof also be variable, preferably variable within the specified limits.

The carbon raw material is usually treated with carbon dioxide or water vapor or a mixture thereof until the thus obtained carbon material has a specific surface area of 500 $m^2/g$ to 2000 $m^2/g$. The treatment of a carbon raw material with carbon dioxide or water vapor or a mixture thereof may preferably be effected until the thus obtained carbon material has a specific surface area of 600 $m^2/g$ to 1500 $m^2/g$. The treatment of a carbon raw material with carbon dioxide or water vapor or a mixture thereof may particularly preferably be effected until the thus obtained carbon material has a specific surface area of 700 $m^2/g$ to 1100 $m^2/g$. For example the thus obtained carbon material may have a specific surface area of 750, 800, 850, 900, 950, 1000 or 1050 $m^2/g$.

The carbon raw material may have a water content of 20 to 90 percent and a sulfur content of less than 0.05 percent and originate from the acetylene water quench process and be treated with carbon dioxide or water vapor or a mixture thereof at a temperature of up to 1100° C., or have a water content of 20 to 90 percent and a sulfur content of less than 0.05 percent and originate from the acetylene water quench process and be treated with carbon dioxide or water vapor or a mixture thereof at a temperature of up to 1100° C. until the thus obtained carbon material has a specific surface area of 500 $m^2/g$ to 2000 $m^2/g$, or have a water content of 20 to 90 percent and a sulfur content of less than 0.05 percent and be treated with carbon dioxide or water vapor or a mixture thereof at a temperature of up to 950° C., or have a water content of 20 to 90 percent and a sulfur content of less than 0.05 percent and be treated with carbon dioxide or water vapor or a mixture thereof at a temperature of up to 950° C. until the thus obtained carbon material has a specific surface area of 500 $m^2/g$ to 2000 $m^2/g$, or have a water content of 20 to 90 percent and a sulfur content of less than 0.05 percent and originate from the acetylene water quench process and have a specific surface area of 100 m²/g to 400 m²/g and be treated with carbon dioxide or water vapor or a mixture thereof at a temperature of up to 1100° C., or have a water content of 20 to 90 percent and a sulfur content of less than 0.05 percent and originate from the acetylene water quench process and have a specific surface area of 200 m²/g to 300 m²/g and be treated with carbon dioxide or water vapor or a mixture thereof at a temperature of up to 1100° C., or have a water content of 20 to 90 percent and a sulfur content of less than 0.05 percent and a nickel content of less than 0.006 percent and originate from the acetylene water quench process and be treated with carbon dioxide or water vapor or a mixture thereof at a temperature of up to 1100° C. until the thus obtained carbon material has a specific surface area of 500 m²/g to 2000 m²/g.

The treatment of the carbon raw material with carbon dioxide or water vapor or a mixture thereof and the treatment of the thus obtained carbon material with an acid may follow one another directly but generally do not follow one another directly. This is because the thus obtained carbon material is customarily cooled before it is admixed with an acid. The cooling of the thus obtained carbon material is usually effected under inert gas. Cooling is generally effected to ambient temperature, for example to a temperature of 20° C. to 30° C.

Yet further process steps may follow the cooling. These may comprise washing steps or steps for mechanical treatment and/or shaping of the thus obtained carbon material before it is admixed with an acid.

In the present process the thus obtained carbon material is admixed with an acid. The thus obtained carbon material may be admixed with an acid which generally has a temperature of 0° C. to 150° C. The thus obtained carbon material may preferably be admixed with an acid which has a temperature of 10° C. to 110° C. In particular the thus obtained carbon material may be admixed with an acid which has a temperature of 20° C. to 100° C. Accordingly the thus obtained carbon material may be admixed with an acid which has a temperature of 40° C., 60° C. or 80° C. for example.

An acid may be a mineral acid or a carboxylic acid or a mixture thereof. An acid may also be a mixture of different mineral acids and/or different carboxylic acids. Mineral and/or carboxylic acids may also be present in diluted form and especially as their aqueous solutions. Mineral and/or carboxylic acids may be a constituent of the above mixtures independently of one another as their aqueous solutions.

It is a matter of routine for those skilled in the art to adjust the concentration of the acids and/or mixtures thereof. It is also a matter of routine for those skilled in the art to select and produce corresponding mixtures of the acids.

The thus obtained carbon material may preferably be admixed with hydrochloric acid, sulfuric acid, phosphoric acid, citric acid, oxalic acid, acetic acid or a mixture thereof. The thus obtained carbon material may particularly preferably be admixed with hydrochloric acid and/or sulfuric acid. The thus obtained carbon material may very particularly preferably be admixed with hydrochloric acid, in particular with hydrochloric acid having a concentration of 5 N (five molar hydrochloric acid).

The carbon raw material may have a water content of 20 to 90 percent and a sulfur content of less than 0.05 percent and originate from the acetylene water quench process and be treated with carbon dioxide or water vapor or a mixture thereof at a temperature of up to 1100° C. and the thus obtained carbon material may be admixed with an acid, or have a water content of 20 to 90 percent and a sulfur content of less than 0.05 percent and originate from the acetylene water quench process and be treated with carbon dioxide or water vapor or a mixture thereof at a temperature of up to 1100° C. and the thus obtained carbon material may be admixed with hydrochloric acid and/or sulfuric acid, or have a water content of 20 to 90 percent and a sulfur content of less than 0.05 percent and originate from the acetylene water quench process and be treated with carbon dioxide or water vapor or a mixture thereof at a temperature of up to 1100° C. until the thus obtained carbon material has a specific surface area of 500 m²/g to 2000 m²/g and the thus obtained carbon material may be treated with hydrochloric acid or sulfuric acid, or have a water content of 20 to 90 percent and a sulfur content of less than 0.05 percent and originate from the acetylene water quench process and be treated with carbon dioxide or water vapor or a mixture thereof at a temperature of up to 1100° C. and the thus obtained carbon material may be admixed with hydrochloric acid having a concentration of 5 N, or have a water content of 20 to 90 percent and a sulfur content of less than 0.05 percent and originate from the acetylene water quench process and have a specific surface area of 100 m²/g to 400 m²/g and be treated with carbon dioxide or water vapor or a mixture thereof at a temperature of up to 1100° C. and the thus obtained carbon material may be admixed with hydrochloric acid, or have a water content of 20 to 90 percent and a sulfur content of less than 0.05 percent and a nickel content of less than 0.006 percent and be treated with carbon dioxide or water vapor or a mixture thereof at a temperature of up to 1100° C. and the thus obtained carbon material may be admixed with hydrochloric acid, or have a water content of 20 to 90 percent and a sulfur content of less than 0.05 percent and a nickel content of less than 0.006 percent and be treated with carbon dioxide or water vapor or a mixture thereof at a temperature of up to 1100° C. until the thus obtained carbon material has a specific surface area of 500 m²/g to 2000 m²/g and the thus obtained carbon material may be treated with hydrochloric acid.

It is usually preferable for the thus obtained carbon material to be at ambient temperature when it is admixed with an acid. However, it is included in the general practical considerations of those skilled in the art to ensure that the thus obtained carbon material during admixing with an acid has a temperature advantageous for process management.

The carbon material admixed with an acid may be treated with water and/or alcohol. Alcohol may be an alcohol or a mixture of different alcohols. The carbon material admixed with an acid may be treated with water and/or alcohol having a temperature of 0° C. to 100° C. The carbon material admixed with an acid may preferably be treated with water and/or alcohol having a temperature of 10° C. to 100° C. The treatment of the carbon material admixed with an acid may particularly preferably be effected with water and/or alcohol having a temperature of 20° C. to 100° C. For example the carbon material admixed with an acid may be treated with water and/or alcohol having a temperature of 40° C., 60° C. or 80° C. Generally the carbon material admixed with an acid is washed with water and/or alcohol, wherein the temperature of water and/or alcohol is not above the respective boiling point at standard pressure.

The treatment of the carbon material admixed with an acid with water and/or alcohol is generally effected until a pH of the washing liquid of 6.5 to 7.5 is established.

The water used for the treatment is generally largely free of impurities. The employed water is ideally free from impurities. Free from impurities is to be understood as meaning that the content of the respective impurities is below the respective limit of detection. Impurities are typically metal salts. Water largely free of impurities is for example distilled water or deionized water.

The alcohol used for the treatment is generally largely free of impurities. The employed alcohol is ideally free from impurities. Impurities are typically metal salts and/or organic compounds which are not alcohol. Alcohol may typically be a C1 to C4 alcohol, wherein said alcohol may be linear or branched. Alcohol may also be any desired mixture of different linear and/or branched C1 to C4 alcohols. Alcohol may be for example methanol, ethanol, propanol, isopropanol, n-butanol or isobutanol or any desired mixture thereof.

After the treatment with water and/or alcohol the carbon material may be dried. The drying of the carbon material may be effected at a temperature of 20° C. to 100° C. in suitable apparatuses. The choice of suitable drying apparatuses and/or conditions is a matter of routine for those skilled in the art.

Carbon Material

The disclosure also provides a carbon material that may be produced by the present process/is obtainable by the present process.

It is thus possible by the present process to obtain a carbon material having a sodium content of less than 0.02 percent and/or an iron content of less than 0.025 percent based on the total dry mass.

One advantage of the present process is that a carbon material of high purity can be obtained.

A measure of high purity may be a high or very high carbon content. The carbon content in the carbon material is typically more than 80 percent based on the total dry mass. The carbon content is usually more than 90 percent based on the total dry mass. The carbon content may preferably be more than 95 percent based on the total dry mass.

A low or very low proportion of alkali metal and/or heavy-metal impurities may also be a measure of high purity. Alkali metal impurities may be sodium and/or potassium. Heavy metal impurities are usually attributable to iron, cobalt, nickel, vanadium, chromium, manganese or copper or mixtures thereof.

The sodium content is less than 0.02 percent based on the total dry mass. The sodium content is usually less than 0.018 percent based on the total dry mass. The sodium content may preferably be less than 0.015 percent based on the total dry mass. The iron content is less than 0.025 percent based on the total dry mass. The iron content is usually less than 0.02 percent based on the total dry mass. The iron content may preferably be less than 0.018 percent based on the total dry mass. The sodium content is less than 0.02 percent and the iron content is less than 0.025 percent based on the total dry mass. The sodium content is usually less than 0.018 percent and the iron content is less than 0.02 percent based on the total dry mass. Preferably the sodium content may be less than 0.015 percent and the iron content may be less than 0.018 percent based on the total dry mass.

The carbon material obtained by the present process may also be free from sodium and/or iron. This is to be understood as meaning that the sodium and/or iron content are below the respective limit of detection. Typically the carbon material obtained by the present process may have a sodium content of 0.013 percent and/or an iron content of 0.009 percent, based on the total dry mass, or more.

The nickel content is often less than 0.006 percent based on the total dry mass. The nickel content is usually less than 0.005 percent based on the total dry mass. The nickel content may preferably be less than 0.004 percent based on the total dry mass.

The carbon material obtained by the present process may also be free from nickel. This is to be understood as meaning that the nickel content is below the respective limit of detection. The carbon material obtained by the present process may typically have a nickel content of 0.002 percent or more.

A measure for high purity may also be a low or very low ash content. The ash content of the carbon material is typically less than 2.0 percent based on the total dry mass. The ash content is usually less than 1.8 percent based on the total dry mass. The ash content may preferably be less than 1.5 percent based on the total dry mass. The ash content in the carbon material is typically more than 1.1 percent based on the total dry mass.

The specific surface area of the carbon material obtained by the present process may be from 500 $m^2/g$ to 2000 $m^2/g$. The specific surface area may preferably be from 600 $m^2/g$ to 1500 $m^2/g$ and the specific surface area may particularly preferably be from 700 $m^2/g$ to 1100 $m^2/g$.

The iodine number of the carbon material obtained by the present process may be from 700 mg/g to 1200 mg/g. The iodine number may preferably be from 750 mg/g to 1000 mg/g and the iodine number may particularly preferably be from 800 mg/g to 950 mg/g.

A measure of high uniformity may be that the chemical composition of the carbon material obtained by the present process is subject to only small variations over time. Thus, carbon material originating from one production batch according to the present process may generally only have small variations in its chemical composition compared to a carbon material originating from another production batch according to the present process.

A carbon material obtained by the present process may also be characterized by a sodium content of less than 0.02 percent and/or an iron content of less than 0.025 percent and an ash content of less than 2.0 percent, a carbon content of more than 95 percent, a sodium content of less than 0.02 percent and/or an iron content of less than 0.025 percent, or a carbon content of more than 95 percent, a sodium content of less than 0.018 percent and/or an iron content of less than 0.02 percent, or a carbon content of more than 95 percent, a sodium content of less than 0.015 percent and/or an iron content of less than 0.018 percent, or a carbon content of more than 95 percent, a sodium content of less than 0.02 percent and/or an iron content of less than 0.025 percent and an ash content of less than 2.0 percent, or a carbon content of more than 95 percent, a sodium content of less than 0.02 percent and/or an iron content of less than 0.025 percent and an ash content of less than 1.8 percent, or a carbon content of more than 95 percent, a sodium content of less than 0.02 percent and/or an iron content of less than 0.025 percent and an ash content of less than 1.5 percent, or a carbon content of more than 95 percent, a sodium content of less than 0.015 percent and/or an iron content of less than 0.018 percent and an ash content of less than 1.5 percent, or a sodium content of less than 0.02 percent and/or an iron content of less than 0.025 percent and an iodine number of 700 mg/g to 1200 mg/g, or a sodium content of less than 0.018 percent and/or an iron content of less than 0.02 percent and an iodine number of 700 mg/g to 1200 mg/g, or a sodium content of less than 0.015 percent and/or an iron content of less than 0.018 percent and an iodine number of 700 mg/g to 1200 mg/g, or a sodium content of less than 0.02 percent and/or an iron content of less than 0.025 percent and/or a nickel content of less than 0.004 percent, or a sodium content of less than 0.02 percent and/or an iron content of less than 0.025 percent and/or a nickel content of less than 0.004 percent and an iodine number of 700 mg/g to 1200 mg/g, or a sodium content of less than 0.02 percent and/or an iron content of less than 0.025 percent and/or a nickel content of less than 0.004 percent and an ash content of less than 2.0 percent and an iodine number of 700 mg/g to 1200 mg/g, or a sodium content of less than 0.015 percent and/or an iron content of less than 0.018 percent and/or a nickel content of less than 0.004 percent and an ash content of less than 1.5 percent and an iodine number of 700 mg/g to 1200 mg/g.

Use of the carbon material obtained by the present process.

On account of its high purity, in particular its high purity and uniformity, the carbon material produced/obtainable by the process according to the invention may also be employed in sensitive fields of application. Sensitive fields of application comprise for example the foodstuffs industry, the pharmaceuticals industry or the electronics industry.

The present disclosure further provides for the use of the carbon material produced/obtainable by the present process for producing an adsorbent, for example for purification of liquids, gases or solids, a carrier material, for example for catalysts, a filling material or an electronics component, for example an electrode or a capacitor. The carbon material produced by the present process is preferably used for producing an adsorbent. An adsorbent may be for example an activated carbon filter or an activated carbon powder.

For the recited purposes the carbon material produced/obtained by the present process may be employed for example as a powder or a shaped article.

It is known to those skilled in the art how shaped articles may be produced from the carbon material produced/obtainable by the present process. This may be effected for example by addition of processing aids, such as graphite, to the carbon material and appropriate shaping, for example by mechanical processing.

Adsorbent

Also disclosed is an adsorbent which comprises the carbon material obtainable by the present process.

Advantages

Since the present process employs damp carbon material it is generally possible to minimize dust formation thus increasing occupational safety and reducing workplace contamination.

The process disclosed here also makes it possible to upgrade carbon raw material generated as a byproduct in acetylene production in the water quench process and subject it to greater value addition.

In addition the present process is not limited to the use, as carbon raw material, of green coke from biomaterials whose production may be ecologically questionable. Carbon materials of high purity and in particular of high purity and uniformity may be produced in ecological and economic fashion.

EXAMPLES

Methods of Determination:

Specific surface area was determined according to DIN ISO 9277:1995.

Determination of carbon, hydrogen, nitrogen by elemental analysis:

Method: The sample was combusted in a helium atmosphere with addition of oxygen and by means of a thermal conductivity detector $NO_x$ was determined after conversion into $N_2$, carbon was determined as $CO_2$ and hydrogen was determined as $H_2O$.

Reagents:

Reaction gas: oxygen

Carrier gas: helium

Combustion catalyst: CuO

Reduction catalyst: Cu

Sample Preparation:

1 to 5 mg of the sample were weighed in under a standard atmosphere. The sample was subsequently placed in a CHN analyzer (carbon, hydrogen, nitrogen).

Measurement Parameters:

Combustion temperature: about 1100° C.

Reduction temperature: about 700° C.

Determination of Sulfur by Elemental Analysis:

Method: The sample was combusted in a helium-oxygen stream (conversion of S to $SO_2$). $SO_2$ was detected by means of a thermal conductivity detector.

Reagents:

Reaction gas: oxygen

Carrier gas: helium

Combustion catalyst: Cu, $WO_3$ on $Al_2O_3$

Additives 2:1 m/m $V_2O_5/WO_3$

Sample Preparation:

1 to 5 mg of the sample were weighed in under a standard atmosphere. The sample was subsequently placed in a sulfur analyzer.

Measurement Parameters:

Combustion temperature: about 1030° C.

Carrier gas pressure: about 100 kPa

Determination of Fe, Ni, Na:

The sample was admixed with concentrated sulfuric acid and heated to 300° C. After evaporation of the sulfuric acid the residue is admixed with a mixture comprising concentrated nitric acid, concentrated perchloric acid and concentrated sulfuric acid and mineralized with gentle warming. The procedure is generally complete when all organic constituents have been oxidized. The acids are removed by further heating and the thus obtained residue is taken up in dilute hydrochloric acid. The thus obtained solution is subsequently analyzed by atomic spectrometry methods, ICP-OES.

The ash content was determined according to ASTM D2866-11

The iodine number was determined according to ASTM D4607 (1999).

Specifications of the employed carbon raw material:

Origin: acetylene water quench process

Carbon content: 96 percent based on the total dry mass of the carbon raw material Water content: 70 weight percent based on the total mass Sulfur content: 0.02 percent based on the total dry mass of the carbon raw material Nitrogen content: <0.7 percent based on the total dry mass of the carbon raw material Sodium content: 0.23 percent based on the total dry mass of the carbon raw material Iron content: 0.19 percent based on the total dry mass of the carbon raw material Nickel content: <0.004 percent based on the total dry mass of the carbon raw material Specific surface area: from 200 to 300 $m^2/g$

Comparative Example 1: Treatment of the Carbon Raw Material with Water

The carbon raw material was manually comminuted. A 200 g sample was initially charged and made up to 550 ml with demineralized water having a temperature of 100° C. The dispersion was separated using a sieve. The sample was subsequently comminuted again and rinsed with a further 200 ml of demineralized water. The obtained dispersion was stirred for one hour at 300 rpm under reflux. The dispersion was subsequently filtered and rinsed with a further 500 ml of hot demineralized water. A sample of 1.9 g was dried to a constant weight for analysis. The sample was dried at 80° C.

Sodium content: 0.12 percent based on the total dry mass

Iron content: 0.19 percent based on the total dry mass

Comparative Example 2: Treatment of the Carbon Raw Material with Hydrochloric Acid The carbon raw material was manually comminuted. A 200 g sample was initially charged and made up to one liter with demineralized water. The dispersion was admixed with 10 ml of hydrochloric acid (37%) and with stirring (300 rpm) heated for one hour under reflux conditions. The dispersion was subsequently filtered and the residue rinsed with a further 500 ml of hot demineralized water. The filter cake was subsequently dispersed in one liter of demineralized water and with stirring (300 rpm) heated for one hour under reflux conditions. The dispersion was filtered and rinsed again with demineralized water (50° C. to 70° C.) until a pH of 7 was established in the washing water. A sample of 1.9 g was dried to a constant weight for analysis. The sample was dried at 80° C.

Sodium content: 0.10 percent based on the total dry mass

Iron content: 0.18 percent based on the total dry mass

Example 1: Treatment of the Carbon Raw Material with Water Vapor 30 kg of carbon raw material were heated to 900° C. in a tubular oven under nitrogen. A heating rate of 10 K/min was employed. 10 minutes after attainment of the target temperature the gas stream was switched over and within a period of one hour comprised 50% water vapor and 50% nitrogen. The thus obtained carbon material was then cooled under a nitrogen atmosphere.

The specific surface area of the thus obtained carbon material was 987 $m^2/g$.

Example 2: Treatment of the Carbon Raw Material with Carbon Dioxide 602 mg of carbon raw material were heated to 900° C. in a thermogravimetry apparatus under argon. A heating rate of 10 K/min was employed. 20 minutes after attainment of the target temperature the gas stream was switched over and within a period of two hours comprised 90% carbon dioxide and 10% argon. The thus obtained carbon material was then cooled under an argon atmosphere.

The specific surface area of the thus treated carbon material was 987 $m^2/g$.

Comparative Example 3: Treatment of the Thus Obtained Carbon Material with Water The carbon material treated with water vapor or carbon dioxide was manually comminuted. A 200 g sample was initially charged and made up to 550 ml with demineralized water having a temperature of 100° C. The dispersion was separated using a sieve. The sample was subsequently comminuted again and rinsed with a further 200 ml of demineralized water. The obtained dispersion was stirred for one hour at 300 rpm under reflux. The dispersion was subsequently filtered and rinsed with a further 500 ml of hot demineralized water. A sample of 1.9 g was dried to a constant weight for analysis. The sample was dried at 80° C.

Sodium content: 0.031 percent based on the total dry mass

Iron content: 0.3 percent based on the total dry mass

Example 3: Treatment of the Thus Obtained Carbon Material with Hydrochloric Acid The carbon material treated with water vapor or carbon dioxide was manually comminuted. A 200 g sample was initially charged and made up to one liter with demineralized water. The dispersion was admixed with 10 ml of hydrochloric acid (37%) and with stirring (300 rpm) heated for one hour under reflux conditions. The dispersion was subsequently filtered and the residue rinsed with a further 500 ml of hot demineralized water. The filter cake was subsequently dispersed in one liter of demineralized water and with stirring (300 rpm) heated for one hour under reflux conditions. The dispersion was filtered and rinsed again with demineralized water (50° C. to 70° C.) until a pH of 7 was established in the washing water. A sample of 1.9 g was dried to a constant weight for analysis. The sample was dried at 80° C.

Sodium content: 0.013 percent based on the total dry mass

Iron content: 0.009 percent based on the total dry mass

Nickel content: <0.004 percent based on the total dry mass

Ash content: 1.32 percent based on the total dry mass

BET: 900 to 1000 $m^2/g$

Iodine number: 854 mg/g

As is apparent from the examples it is possible to obtain from the carbon raw material in the present process a carbon material having a sodium content of 0.013 and an iron content of 0.009 percent based on the total dry mass.

The invention claimed is:

1. A process, comprising:
    treating with carbon dioxide, water vapor, or a mixture of both, at a temperature of 1100° C. or less, a carbon raw material obtained from quench water of an acetylene synthesis, to obtain a treated carbon material with an increased specific surface area; and
    mixing the treated carbon material with an acid, to obtain a product carbon material,
    wherein the carbon raw material has a water content of 55 to 85 wt. % based on a total carbon raw material mass, and a sulfur content of less than 0.05 percent based on a total dry mass of the carbon raw material, and
    wherein the product carbon material has a specific surface area in a range of from 500 to 2000 $m^2/g$.

2. The process of claim 1, wherein the product carbon material has an iron content less than 0.018 wt. %, based on the total dry mass.

3. The process of claim 1, wherein the carbon raw material has a nickel content of less than 0.006 wt. %, based on the total dry mass of the carbon raw material.

4. The process of claim 1, wherein the treating comprises treating the carbon raw material with the carbon dioxide.

5. The process of claim 1, further comprising: adjusting the water content of the carbon raw material by drying.

6. The process of claim 1, wherein the acid comprises hydrochloric acid, sulfuric acid, phosphoric acid, citric acid, oxalic acid, and/or acetic acid.

7. The process of claim 1, wherein the acid comprises hydrochloric acid and/or sulfuric acid.

8. The process of claim 1, wherein the acid comprises hydrochloric acid.

9. The process of claim 1, wherein the product carbon material has a sodium content of less than 0.02 wt. % and/or an iron content of less than 0.025 wt. %, based on the total dry mass.

10. The process of claim 1, wherein the product carbon material has an iodine number in a range of from 700 mg/g to 1200 mg/g.

11. The process of claim 1, wherein the carbon raw material has a specific surface area in a range of from 100 to 400 $m^2/g$.

12. The process of claim 1, wherein the carbon raw material has a nitrogen content of less than 1.5 wt. %, based on the total dry mass.

13. The process of claim 1, wherein the carbon raw material is green coke.

14. The process of claim 1, further comprising, prior to the treating:
    sedimenting the quench water, comprising carbonaceous material, from the acetylene synthesis, to separate off and feed the carbonaceous material to the treating as the carbon raw material.

15. The process of claim 14, further comprising: dewatering the carbonaceous material after the sedimenting and before feeding the carbonaceous material to the treating as the carbon raw material.

16. The process of claim 1, wherein the carbon raw material has a water content of 40 to 85 wt. %, based on the total carbon raw material mass.

17. The process of claim 1, wherein the carbon raw material has a water content of 50 to 85 wt. %, based on the total carbon raw material mass.

18. The process of claim 1, further comprising: adjusting the water content of the carbon raw material by adding another carbon material.

19. The process of claim 1, further comprising:
    adjusting the water content of the carbon raw material by drying; and
    adjusting the water content of the carbon raw material by adding another carbon material.

* * * * *